United States Patent [19]
Diaz

[11] Patent Number: 5,429,580
[45] Date of Patent: Jul. 4, 1995

[54] FILTER ASSEMBLY APPARATUS

[75] Inventor: Jose A. Diaz, Tampa, Fla.

[73] Assignee: Precisionaire, Inc., Bartow, Fla.

[21] Appl. No.: 55,248

[22] Filed: May 3, 1993

[51] Int. Cl.⁶ ............................................. B31D 5/04
[52] U.S. Cl. .................................. 493/374; 53/382.3; 55/511; 493/386; 493/941
[58] Field of Search ............... 493/177, 178, 179, 183, 493/453, 437, 438, 941, 386, 374; 264/DIG. 48; 29/509, 163.8; 55/511; 53/382.3 R, 387.3

[56] References Cited

U.S. PATENT DOCUMENTS

| | | | |
|---|---|---|---|
| 2,161,831 | 6/1939 | Manning | 493/941 |
| 3,374,604 | 3/1968 | Roesner | 493/179 |
| 3,452,653 | 7/1969 | Berney | 53/382.3 |
| 4,210,067 | 7/1980 | Evans, Jr. | 93/1 F |
| 4,233,798 | 11/1980 | Helding | 493/179 |
| 4,570,844 | 2/1986 | Wysocki | 229/16 D |
| 4,731,047 | 3/1988 | Lobb | 493/10 |
| 4,737,174 | 4/1988 | Pontius | 55/316 |
| 5,058,361 | 10/1991 | Schmacher | 53/387.3 |

*Primary Examiner*—Jack W. Lavinder
*Attorney, Agent, or Firm*—Nixon & Vanderhye

[57] ABSTRACT

Apparatus for use in a filter assembly operation wherein filter components are seated within a filter frame such that the frame has a generally upstanding leading flap, side flaps and a trailing flap. The apparatus includes side flap engaging members adapted to push the pair of side flaps outwardly to provide clearance necessary to close the leading and trailing flaps. A stationary ski member located downstream of the side edge engaging members is adapted to close the leading edge, and a retractable ski member located at least partially upstream of the retractable side flap engaging members is adapted to close the trailing flap, thereby permitting the side flaps to be subsequently closed in at least partially overlapping relationship with the leading and trailing flaps. A related method is also disclosed.

18 Claims, 7 Drawing Sheets

FILTER ASSEMBLY APPARATUS

FILTER ASSEMBLY APPARATUS

This invention relates to a filter assembly apparatus, and more specifically, to a device which moves side flaps of the filter frame outwardly to permit front and rear flaps to be folded first, without interference from the side flaps, as the filter assembly moves linearly along a continuous conveyor.

BACKGROUND AND SUMMARY OF THE INVENTION

Conventional equipment for assembling filters, such as furnace filters, require considerable manual labor input to complete the assembly of the filter and surrounding frame. Furnace filter assemblies typically include a square or rectangular chipboard (or heavyweight paper) frame which surrounds and holds in place a filter media pad with or without air flow grid sheets on one or both sides of the filter media pad. Typically, the frame is arranged on a conveyor and workers manually insert the filter media pad (and one or more air flow grid sheets if required) as the filter moves along the conveyor line. Upon insertion of the filter elements into the frame, it is necessary to fold the generally upstanding frame flaps downwardly to a flat position and to hold the flaps in the folded position until the filter travels under stationary "skis" in the apparatus which hold the flaps in the folded position until the frame travels between top and bottom heated plates which reactivate pre-applied glue strips on the chipboard frame.

It is necessary to fold the frame flaps in proper sequence, i.e., the leading and trailing flaps (relative to the direction of movement of the filter assembly on the conveyor) must be folded before the side flaps. Since, however, the flap portions typically do not stand up vertically, it is necessary to open up the side flaps to provide the space necessary to effect folding of the leading and trailing flaps. After the leading and trailing flaps are folded, then the side flaps may be folded and glued to complete the assembly. To the best of applicant's knowledge, manipulation of the side flaps to permit machine folding of the leading and trailing flaps (and then also the side flaps) has always been done manually by workers stationed along the conveyor line.

It is the principal object of this invention to provide a folding apparatus in line with a conveyor, which automatically separates (or opens) the side flaps and then folds the leading and trailing flaps while the filter assembly travels in continuous fashion along the conveyor.

In the exemplary embodiment, conventional filter processing apparatus has been modified to incorporate a pair of rotating augers which are movable between inoperative and operative positions. Once having been moved to the operative position, the augers are then engaged by the typically partially folded side flaps of the filter as the filter proceeds along the conveyor line. The rotating augers open the side flaps and hold them open as the leading flap passes under the conventional stationary skis which fold the leading flap downwardly. At the same time, and while the side flaps are held in the open position by the rotating augers, a retractable ski or kicker is moved downwardly and forwardly (in the direction of movement of the filter) to fold the trailing filter flap. This retractable ski is positioned, and its movement timed, such that it will fold the trailing flap and hold same in the folded position until same moves under the stationary skis while the augers continue to hold the side flaps in the open position. With the leading and trailing flaps thus held in a folded position by the stationary skis, the filter continues to travel past the rotating augers and, almost immediately, conventional side edge guides downstream of the augers are utilized to fold the side flaps downwardly in overlapping relationship with the already folded leading and trailing flaps. Depending on the length and speed of the conveyor, i.e., closeness of the filters, it may be desirable to retract the augers to an inoperative position at the exit of each filter—retraction of the augers is an optional operation. Thereafter, the filter assembly is immediately passed between top and bottom heating plates which hold all of the flaps in the folded position while pre-applied glue strips (along the frame edges) are heat activated to complete the assembly process.

In its broader aspects therefore, the present invention relates to an apparatus for assembling a filter media pad in a filter frame wherein the filter frame includes upstanding forward, rearward and side flaps, the improvement comprising a pair of rotatable augers arranged to engage the side flaps of the filter and to move the side flaps outwardly to permit folding of the forward and rearward flaps.

In another aspect, the invention provides an apparatus for use in a filter assembly operation wherein filter components are seated within a filter frame such that the frame has a generally upstanding leading flap, side flaps and a trailing flap, the apparatus comprising side flap engaging members adapted to push the pair of side flaps outwardly to provide clearance necessary to close the leading and trailing flaps; a stationary ski member located downstream of the side flap engaging members and adapted to close the leading flap; and a retractable ski member located at least partially upstream of the retractable side flap engaging members and adapted to close the trailing flap, thereby permitting the side flaps to be subsequently closed in an overlapping relationship with the leading and trailing flaps.

In still another aspect, the present invention relates to apparatus for assembling a filter including a frame surrounding and supporting a filter media pad, the frame having forward, side and trailing flaps adapted for folding downwardly into engagement with the filter media pad, the apparatus comprising a conveyor for feeding a plurality of filters in a first direction; first means for opening the side flaps on the conveyor; second means for closing the forward flap; third means for folding the rear flap; fourth means for folding the side flaps; and fifth means for holding the front, rear and side flaps in a folded condition.

In still another aspect, the invention relates to a process for closing open forward, trailing and side flaps of a frame about an insert seated within the frame, and wherein the frame includes at least partially open forward, trailing and side flaps, the method comprising the steps of:

a) feeding the frame and insert continuously in a first linear direction;

b) engaging the side flaps of the frame by a pair of rotating members to move the side flaps outwardly to a fully open position during continuous linear movement of the frame and insert;

c) folding the forward and trailing flaps to a closed position while the side flaps are engaged by the pair of rotating members; and d) folding the side flaps downwardly to a closed position, overlapping the forward and rearward flaps.

By modifying the conventional filter processing apparatus as described above, considerable manpower is saved in the filter assembly process. Other objects and advantages of the invention will become apparent from the detailed description which follows.

BRIEF DESCRIPTION OF THE DRAWINGS

FIG. 6a is a partial section taken along the line 6a—6a in FIG. 6;

DETAILED DESCRIPTION OF THE DRAWINGS

Figure 1:
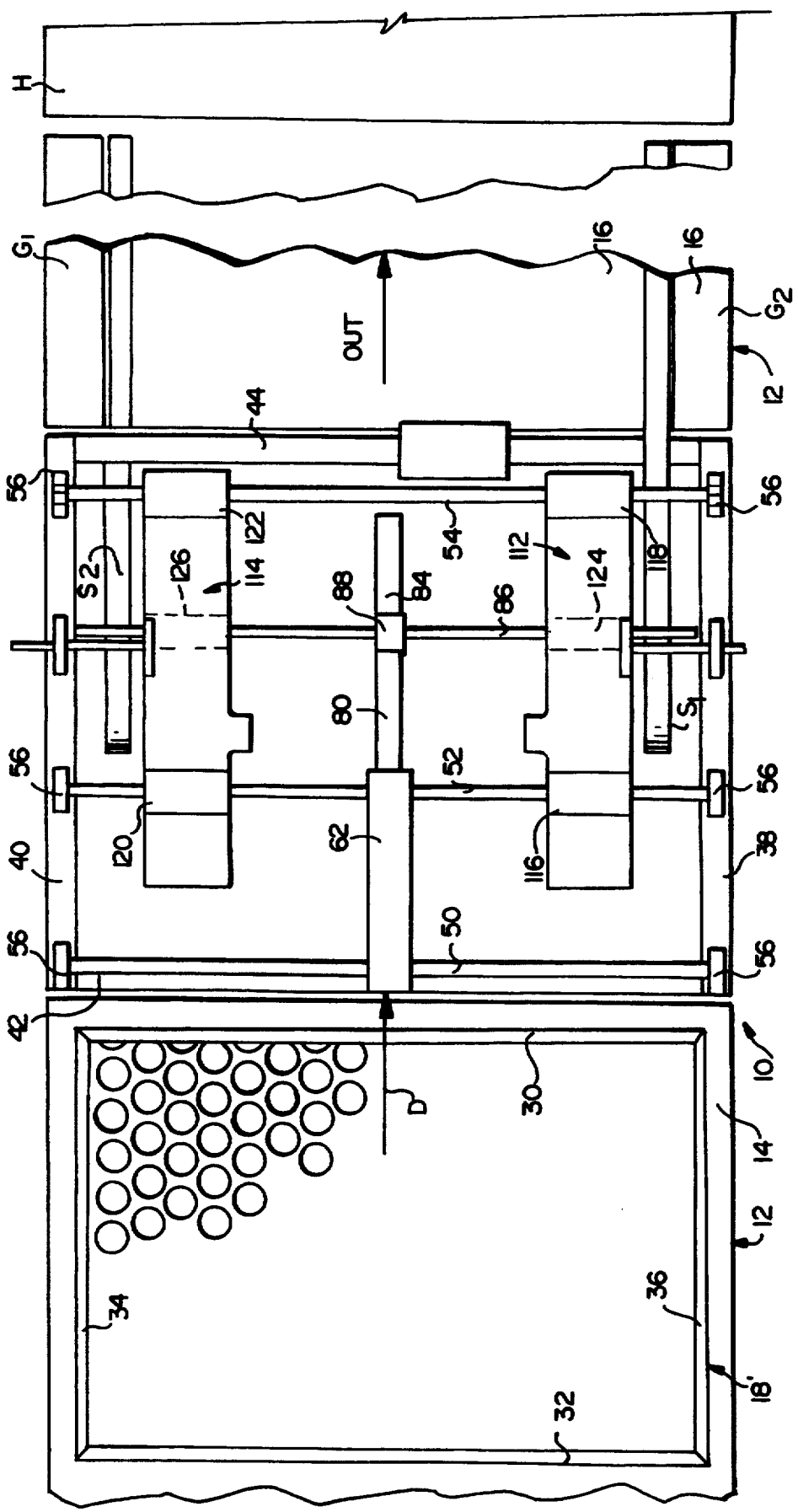
FIG. 1 is a plan view illustrating generally the components of this invention, located along a continuous conveyor line utilized in the assembly of furnace filters.

With reference to FIG. 1, the filter apparatus 10 is located along a conveyor 12 having an inlet section 14 (relative to the device 10) and an outlet section 16.

Filter assemblies (one shown at 18) are introduced successively and continuously into the apparatus 10 via conveyor inlet section 14 and are carried through the device 10 by the same conveyor 12, exiting the device at the outlet section 16 and continuing through a pair of conventional side guides $G_1$, $G_2$ and then between top and bottom (one shown in FIG. 1) hot plates H as described in further detail below.

Figure 2:
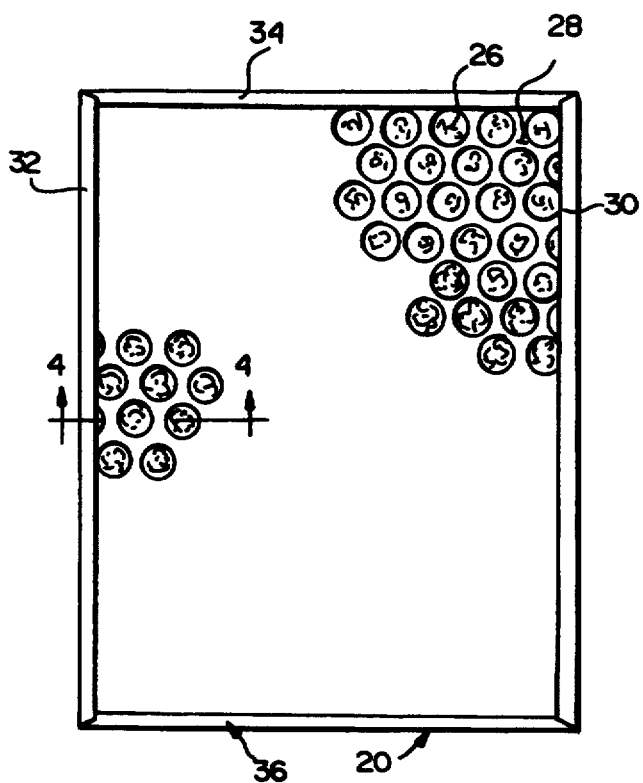
FIG. 2 is a plan view of a conventional furnace filter of the type which can be assembled by the apparatus in accordance with the process of this invention.
Figure 4:
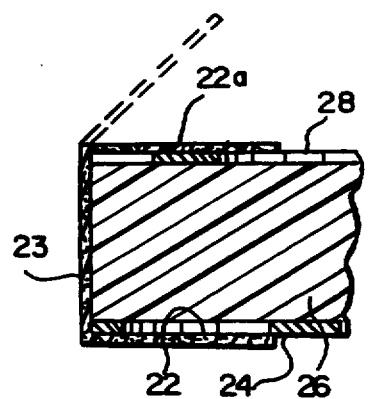
FIG. 4 is a partial section view of the filter illustrated in FIG. 3, prior to final gluing of the filter frame.
Figure 3:
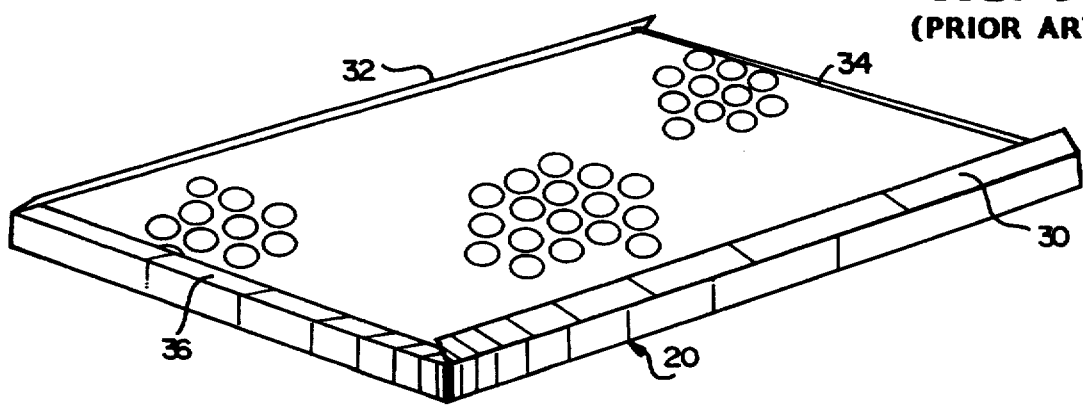
FIG. 3 is a perspective view of the filter illustrated in FIG. 2.

Prior to describing the apparatus 10, it will be helpful to understand the construction of the filter assembly 18. As shown in FIG. 2, each filter assembly includes a pre-cut and folded chipboard frame 20, which is generally square or rectangular in shape in its final configuration. With reference to FIG. 4, it will be appreciated that the frame is essentially a squared C-shape, such that an underlying horizontal flange 22 extends inwardly from the bottom of a vertical peripheral rim 23, and an upper horizontal flange 22a (formed by flaps further described below) extends inwardly from the top of the rim 23. Upon initial processing, the upper flap elements which comprise the upper flange 22a are generally in the position shown in phantom in FIG. 4. This allows manual insertion of a first grid sheet 24, a filter media pad 26, and a second grid sheet 28 (as in conventional filter constructions with the understanding that the grid sheets are optional) supported on the lower flange 22. To secure the grid sheets 24, 28 and the pad 26 within the frame, the upper flaps (i.e., the upper legs of the C-shaped frame) must be folded (in proper sequence) inwardly and downwardly to a horizontal orientation and then glued in place. Thus, with reference to FIGS. 1-3, the forward or leading flap 30, and rearward or trailing flap 32 must be folded downwardly toward the upper grid sheet 28, before the side flaps 34, 36 are folded. To facilitate this folding sequence, the apparatus 10 of this invention automatically opens the side flaps 34 and 36 to provide the space necessary to permit the forward and trailing flaps 30 and 32 to be folded first. The apparatus 10 then automatically and sequentially folds the leading, trailing and side flaps 30, 32, 34 and 36 in that order.

With further regard to the filter constructions, and as noted above, one or both of the grid sheets 24, 26 may be omitted for certain applications.

In addition, it will be appreciated that the overlapping ends of the one piece filter frame are secured by pressure sensitive adhesive in the usual manner when the frame is initially positioned on the conveyor. Beads of heat activated adhesive are pre-applied along facing surface edges of the upper and lower flanges 22 and 22a of the C-shaped frame, and these beads of adhesive are heat activated as the filter assembly passes between top and bottom conventional hot plates following processing through the apparatus of this invention. The specific manner in which the frame flaps are fixed in place by heat activated adhesive is also conventional.

Returning now to FIG. 1, the filter apparatus includes a pair of longitudinal frame members 38 and 40 extending along either side of the conveyor 12, in the direction of travel of the filter frame assemblies, indicated by arrow D (located on a centerline of the apparatus, corresponding to a centerline of the filter 18). The longitudinal frame members 38 and 40 are connected by transverse frame members 42 and 44. Vertical frame members (two shown at 46, 48 in FIG. 8) extend from the corners of the rectangular frame, downwardly to a supporting surface or floor, not shown. Cross bars 50, 52 and 54 also extend between frame members 38, 40, each secured by a pair of shaft support blocks 56. It will be understood that the upper rectangular frame formed by members 38, 40, 42 and 44, as well as cross bars 50, 52 and 54 all lie above and substantially parallel to the plane of the conveyor 12 (see FIG. 8).

Figure 8:
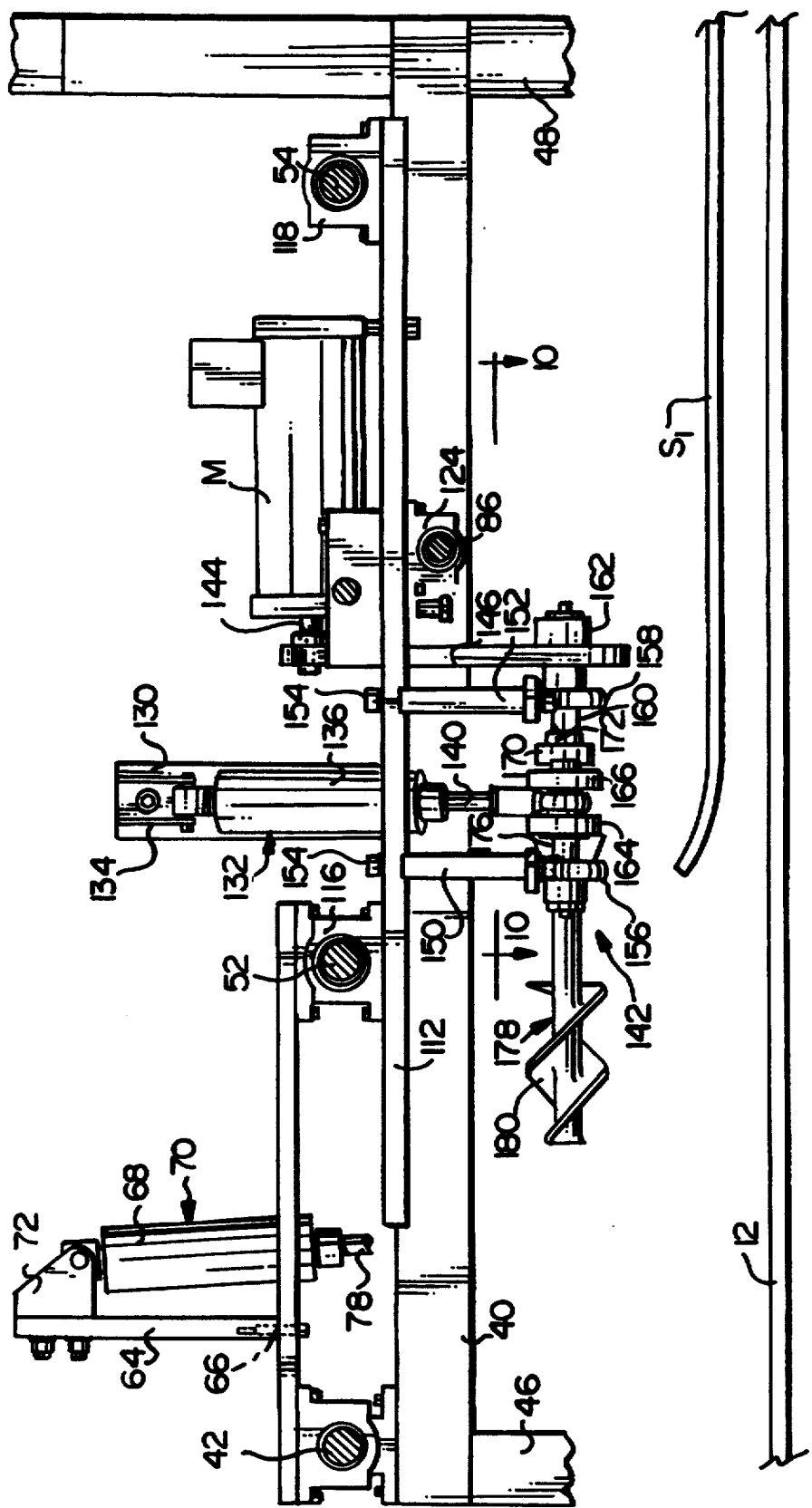
FIG. 8 is a side view of the component illustrated in FIG. 7.

Located below the frame members 38, 40, 42 and 44, but above the conveyor 12 are a pair of stationary, elongated skis $S_1$ and $S_2$. These members extend parallel to the direction of travel of the filter 18 and are laterally spaced so as to engage the leading flap 30 of the filter 18 at the opposite ends thereof. These skis $S_1$ and $S_2$ are conventionally used to fold the forward or leading flap 30 downwardly against the filter media part 26 (or grid sheet 28). This folding action is facilitated by bending the ends of the skis $S_1$ and $S_2$ upwardly as shown in FIG. 8, thereby providing a smooth transition to the folding action. It will be further appreciated that after the trailing flap 30 is folded downwardly by the apparatus 10, skis $S_1$ and $S_2$ will hold both leading and trailing flaps 30 and 32 in the folded position as the filter continues its movement along the conveyor, under the skis.

Figure 5:
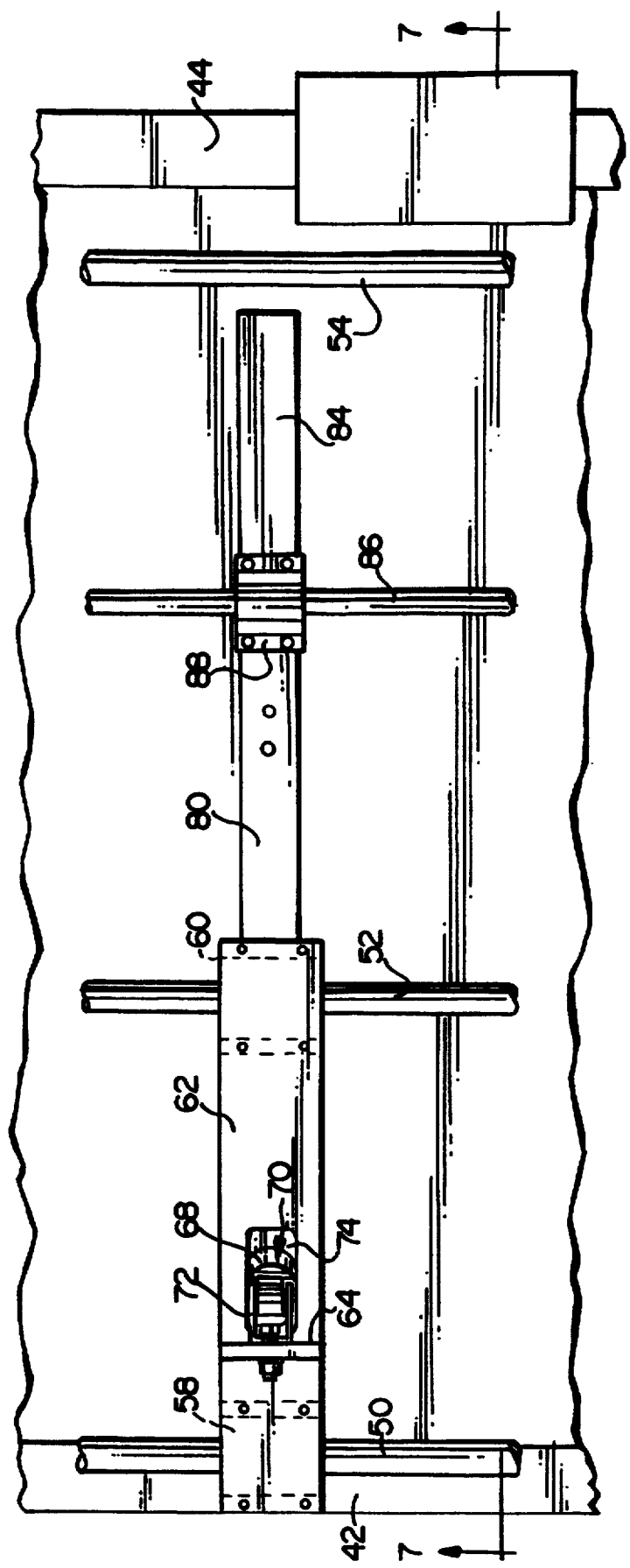
FIG. 5 is a more detailed plan view of a retractable ski component of the invention as illustrated in FIG. 1.
Figure 6:
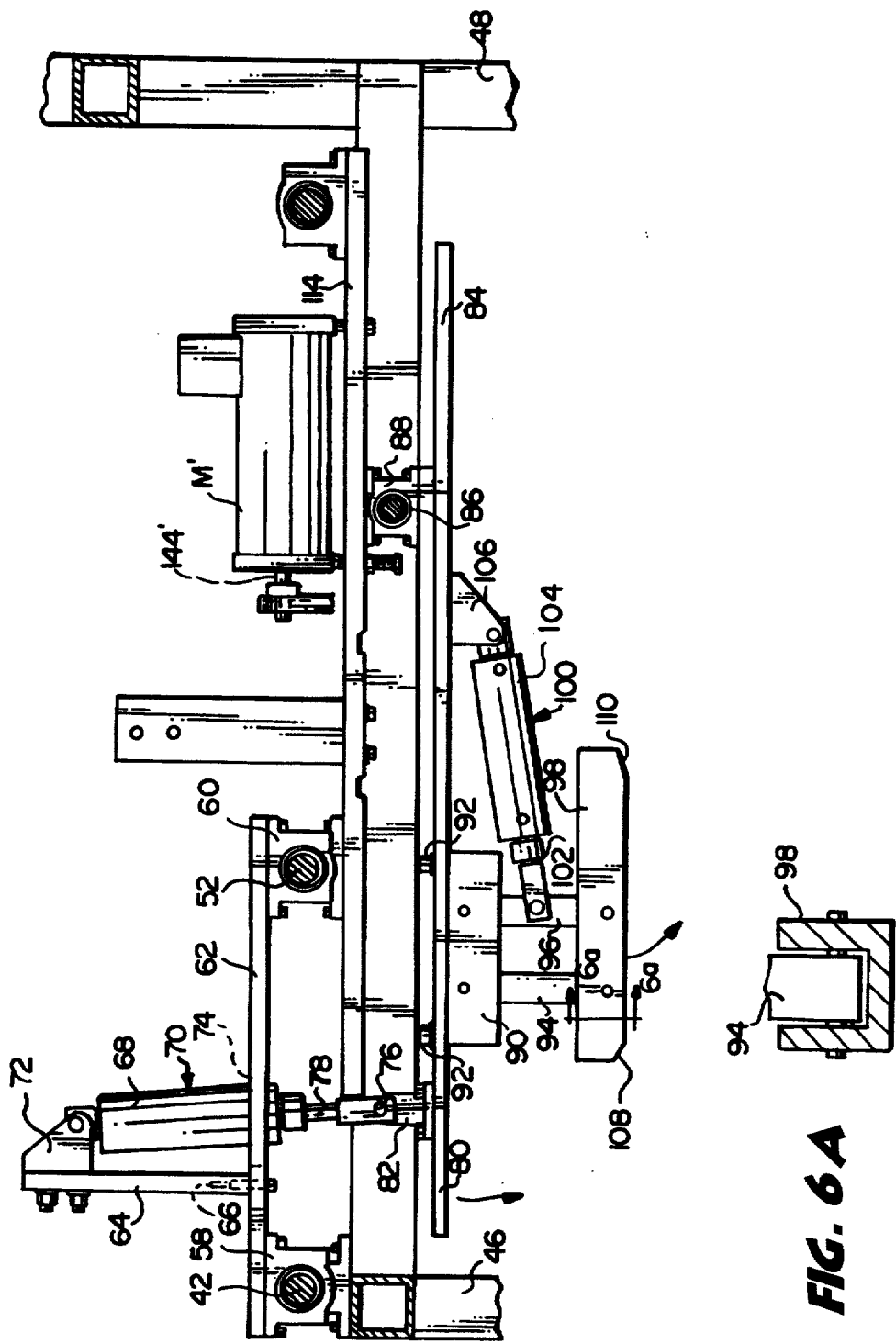
FIG. 6 is a side view of the component illustrated in FIG. 5.

With reference particularly to FIGS. 1, 5 and 6, the cross bars 50 and 52 support via pillow block bearings 58 and 60, and a center assembly mounting plate 62 located substantially midway between the ends of the cross bars, i.e., substantially along the longitudinal centerline or axis of the conveyor 12. The plate 62, in turn, supports a cylinder mounting bracket 64 by means of, for example, a socket screw 66. The bracket extends upwardly away from the plate 62 and supports at its upper end a cylinder 68 of a piston cylinder assembly 70, via pivot bracket 72. The cylinder 68 extends downwardly through a slot 74 in the plate 62, and a forward end 76 of the piston rod 78 is connected to a center pivot plate 80 via rod pivot mount 82. The center pivot plate 80 is also pivotally supported (nearer its rearward end 84) by cross shaft 86 via pillow block bearing 88.

The center pivot plate 80 mounts a kicker mounting bracket 90 on its underside (see FIG. 6) via socket head screws 92. A pair of parallel links 94, 95 are each pivotally pinned to the bracket 90 at first ends of the links and pivotally pinned to a retractable ski or kicker 98 at second ends of the links.

A piston/cylinder assembly 100 is secured between a mid point of the link 96 and the underside of plate 80. More specifically, the forward end of the piston rod 102 of the assembly 100 is pivotally secured to the link 96 intermediate the ends of the link, and the remote end of the cylinder 104 is pivotally secured to the underside of plate 80 via pivot bracket 106.

The retractable ski or kicker 98 is an elongated U-shaped member (see FIGS. 6a) with tapered forward and rearward edges 108, 110, respectively, and is used to fold the rearward or trailing flap 32 of the filter assembly as described in greater detail below.

It will be appreciated from the above described construction that actuation of piston/cylinder assembly 70 will extend the piston rod 78 downwardly to thereby cause plate 80 (along with bracket 90, kicker 98, etc.) to pivot downwardly in a counterclockwise direction about the cross shaft 86. The stroke of the piston rod 78 is relatively short, i.e., between about 1 and 2 inches.

In addition to this movement, it will also be appreciated that retraction of the piston rod 102 of piston/cylinder assembly 100 into the cylinder will cause the retractable ski or kicker 98 to traverse a downward and forward (in the direction of travel of the filter 18) path of movement as the links 94, 96 pivot about their respective mountings in the bracket 90 (the kicker 98 is shown in FIG. 6 at the end of its forward path of movement—and plate 80 is shown in its extended state). In use, extension of piston rod 78 is followed quickly by retraction of piston rod 102 in order to effect folding of the trailing flap 32.

With reference again to FIGS. 1, 7 and 8, the cross bars 52 and 54 also support a pair of auger assembly mounting plates 112, 114. Thus, plate 112 is secured to cross shafts 52 and 54 by means of pillow block bearings 116, 118, respectively, and plate 114 is similarly secured by pillow block bearings 120 and 122. It should be further noted here that the cross shaft 86 which is secured at its mid point to the center pivot plate 80, is also secured to the undersides of mounting plates 112 and 114 by pillow block bearings 124, 126, respectively.

Since the structure and function of the various elements secured to plate 112 are identical to those secured to plate 114, only the plate 112 will be described in detail. For convenience, like reference numerals with a "prime" designation added have been applied to the elements supported on plate 114 (some elements of plate 114 are visible in FIG. 6).

Figure 7:
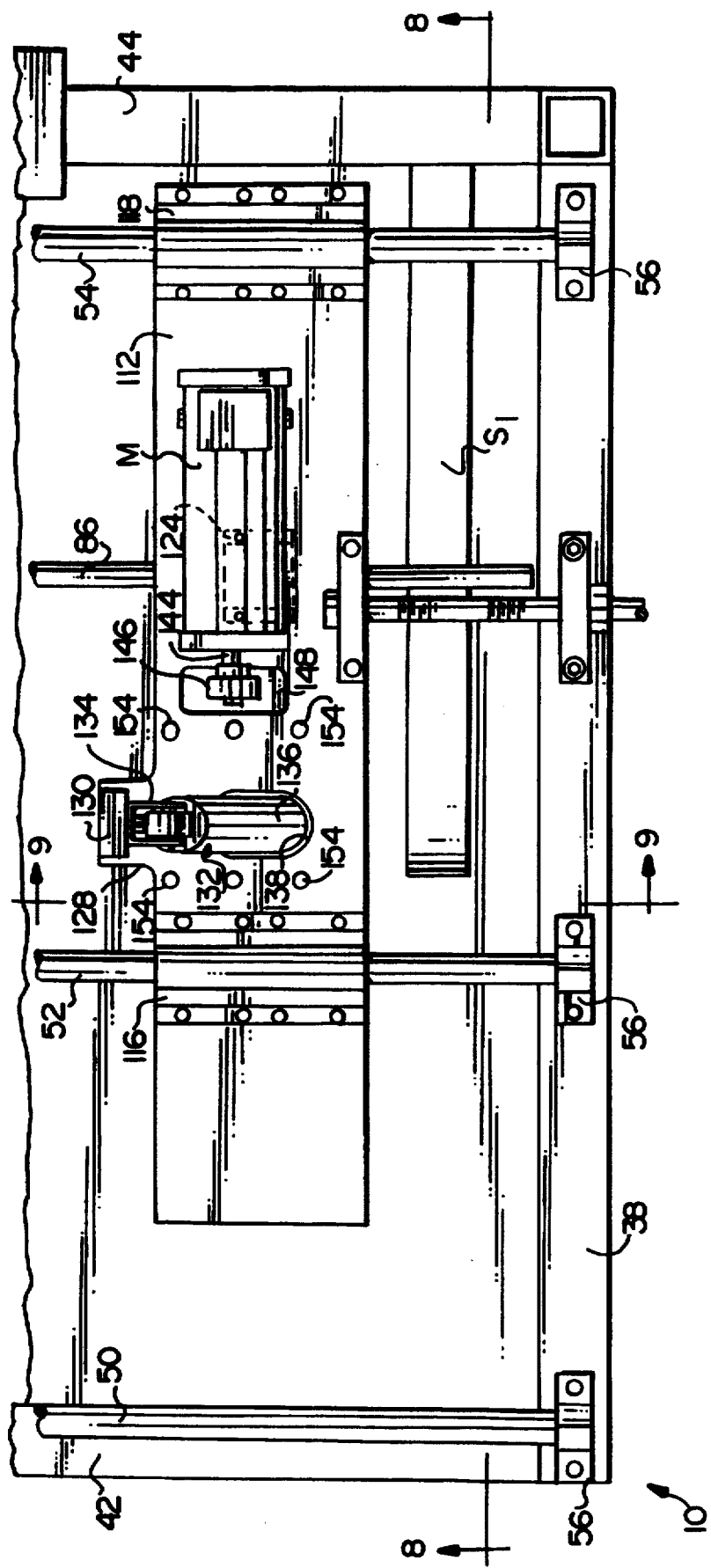
FIG. 7 is a more detailed plan view of a rotating auger component of the invention as illustrated in FIG. 1.

With specific reference to FIGS. 7 and 8, the plate 112 is substantially rectangular in shape and includes a projecting surface 128 which extends toward the center cylinder mounting bracket 80. Surface 128 mounts an auger assembly cylinder mounting bracket 130 which extends vertically upwardly from the plate 112. A piston/cylinder assembly 132 is pivotally secured to the upper end of bracket 130 via pivot bracket 134. The cylinder 136 of the assembly 132 extends downwardly through an elongated aperture 138 in the plate 112. The piston rod 140 of the assembly 132 is pivotally secured to the right hand auger assembly 142 as described further below.

Also secured to the upper surface of plate 112 is an electric motor M which has an output shaft 144 which mounts a timing belt 146 which, in turn, extends downwardly through an aperture 148 in the plate 112 and is secured to the auger assembly 142, as also described below.

The auger assembly 142 is secured to the underside of plate 112 by means of a pair of mounting plates 150, 152 which are themselves secured to plate 112 by screws 154 (three for each plate 150, 152). Plates 150, 152 extend vertically downwardly from the horizontal plate 112 and have fixed at their lowermost ends, pillow block bearings 156, 158. An auger assembly drive shaft 160 is received in and supported by the axially aligned bearings. The drive shaft 160 at one end mounts a timing belt pulley 162 to which the other end of timing belt 146 is connected.

Figure 9:
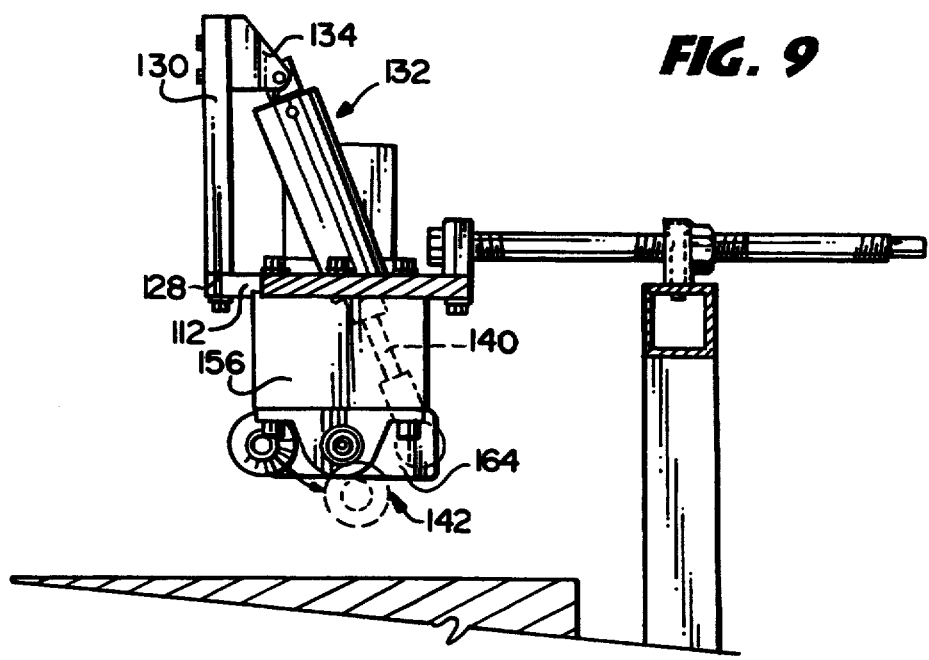
FIG. 9 is a section view taken along the line 9—9 in FIG. 7.
Figure 10:
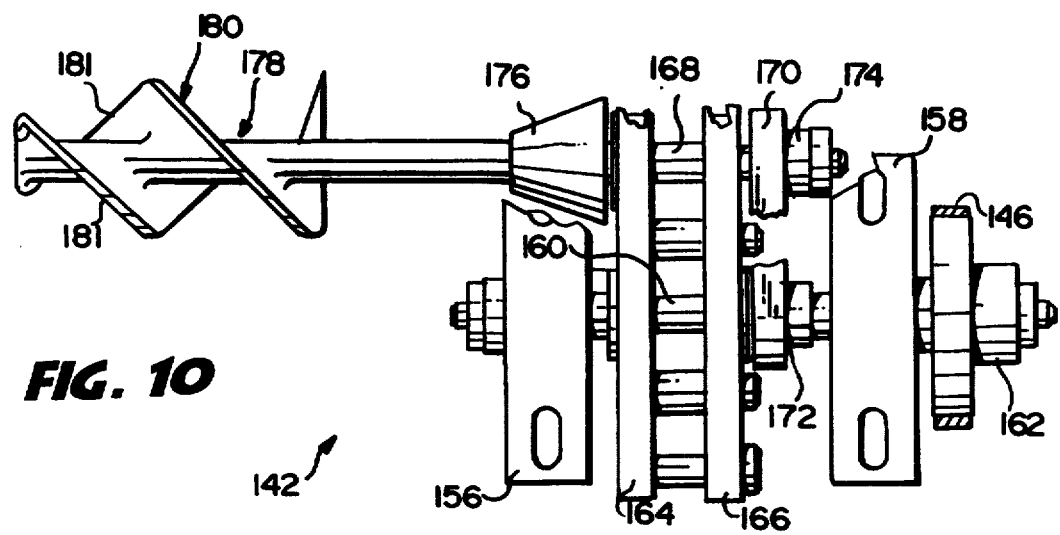
FIG. 10 is a plan taken along the line 10—10 in FIG. 8.

A pair of auger bearing plates 164, 166 are secured to the shaft 160 such that the shaft 160 may rotate relative to the auger bearing plates. The latter extend horizontally on either side of the drive shaft 160 as best seen in FIGS. 9 and 10. Thus, at one end of the auger bearing plates 164, 166, the piston rod 140 of cylinder assembly 132 is pivotally secured. At the other end of the plates 164, 166, a screw shaft 168 is secured, again for rotation relative to the plates 164, 166. A timing/drive belt 170 extends between a second pulley 172 on the drive shaft 160 and an aligned pulley 174 on the screw shaft 168. A conical bearing shield 176 is also fixed to the auger shaft, adjacent the bearing plate 164.

The auger shaft 168 extends in an upstream direction, i.e., toward the inlet end of the folding device 10 and terminates with an auger element 178 having a continuous spiral 180 which creates a plurality of flights 181.

It will be appreciated that a point in contact with the spiral 180 will be axially displaced as the auger element 178 rotates. The magnitude of the displacement for each revolution of the auger element 178 is equal to the pitch (the distance between 2 flights of the spiral along a plane perpendicular to the auger shaft). The direction of this displacement is dictated by the direction of rotation of the auger and, in this case, the displacement direction coincides with the direction of movement of the filter 18. It will also be appreciated that a body (i.e., flaps 34, 36) in contact with the outer diameter of a rotating auger is affected by tangential (outward) as well as axial velocities and forces.

The piston/cylinder assembly 132 is arranged so that, upon retraction of piston rod 140, the auger element 178 will move in an arcuate path between an inoperative position (shown in solid lines in FIG. 9) to an operative position (shown in dotted lines in FIG. 9).

OPERATION

In operation, the filter 18 is loosely assembled along the conveyor 12 as it approaches the device 10. More specifically, the frame 20, which is preferably of one piece construction and generally (initially) C-shaped in cross section, with the lower horizontal leg or flange 22 extending inwardly, is placed on the conveyor. Once properly positioned on the conveyor, a lower or first air guide sheet (thin foil with an array of circular holes) 24 is placed within the frame, followed by the filter media pad 26 and an upper or second air guide sheet 28, it being understood that the air guide sheets are optional.

With these components loosely seated within the properly arranged frame, the assembly approaches the apparatus 10.

Figure 11:
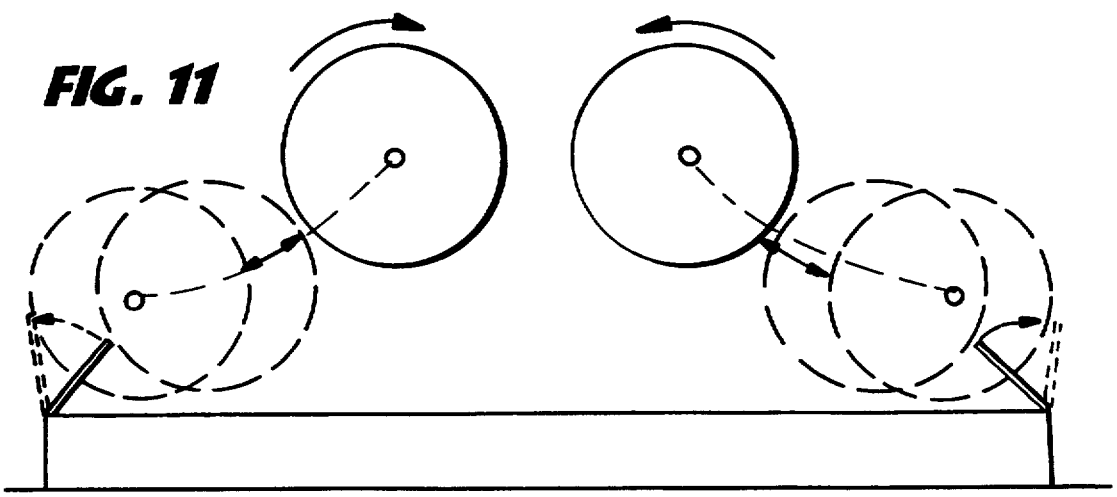
FIG. 11 is a schematic representation of the path of movement of the rotating augers between operative and inoperative positions in accordance with the invention.

Initially, and as best seen in FIG. 11, the pair of right and left handed auger assemblies 142 and 142' rotating continuously, driven by, in the case of assembly 142, motor M via drive belts 146 and 170, will swing downwardly and inwardly to their operative position by reason of the retraction of piston rod 140 of the piston/cylinder assembly 132. The auger elements 178 and 178' are then contacted by the upstanding side flaps 34, 36 of frame 20 as the frame moves along the apparatus via conveyor 12. As a result of the tangential forces imparted by the rotating augers, the side flaps 34, 36 are moved outwardly to provide the necessary clearance for the folding of the leading and trailing flaps 30 and 32. The auger elements 178, 178' have a rotational speed which is approximately matched to the filter assembly linear speed so that the auger elements serve only to move and hold the side flaps 34, 36 apart.

In either case, the augers 178, 178' allow the leading flap 30 to be engaged and folded inwardly by the elongated stationary skis $S_1$ and $S_2$ as the filter passes beneath the skis. The latter then hold the leading flap down as the filter continues along the conveyor.

When the augers have been engaged by the side flaps 34, 36, the piston/cylinder assembly 70 is actuated to lower the plate 80 as described above. Plate 80 is kept in this lower position while the system is in operation. When the filter reaches a predetermined location on the conveyor, piston rod 102 of the piston/cylinder assembly 100 is retracted to swing the retractable ski or kicker 98 downwardly and in the direction of movement of the filter 18 at a speed greater than the linear speed of the filter, thereby folding the rearward flap 32 downwardly onto the media pad 26 (or grid sheet 28). Movement and location of the retractable ski or kicker 98 is such that the ski holds the rearward or trailing flap 32 down until it too is held down by the stationary skis $S_1$ and $S_2$.

The mode of operation described below has been of preference when clearance between filters has been small.

Once the forward and trailing flaps 30 and 32 are under the stationary skis $S_1$, $S_2$, the augers 178, 178' are retracted to their inoperative position by reason of the extension of piston rods 140, 140'. In the retracted position, there is a clearance between the highest point of an open filter frame and the bottom of the auger flights. Essentially simultaneously with the movement of the augers 178, 178' to their inoperative position, the retractable ski assembly including kicker 98 and plate 80 is moved to its inoperative position, thereby readying the apparatus 10 for the next filter. It should be noted that the function of retractable plate 80 is to permit quick retraction of the entire retractable ski assembly so as to not interfere with the next successive filter.

It has been found in operation that plate 80 does not have to swing to an inoperative position under all conditions, but is rather an alternate and occasionally preferred mode of operation. It has also been found that augers 180 and 180' do not need to be moved to inoperative positions as part of the sequence for folding each filter, but rather, such movement is an alternative and occasionally preferred mode of operation. Instead, the following mode of operation (simplified) has been identified and performed with a great deal of success in continued operation.

Augers 178 and 178' are kept in the operative position and only the retractable ski or kicker 98 is cycled to close the rearward or trailing flap 32 of each filter.

Keeping the augers in the operative position all the time permits them (augers) to make contact with the next filter and move side flaps of the filter 34, 36 open before the kicker 98 is moved to inoperative position. In this case, kicker 98 may contact the next successive filter and cooperate with the stationary skis S1, S2 in closing the leading edge 30 of the next filter, then ski 98 may move to inoperative position and wait for next trailing flap.

As the filter leaves the device 10, conventional stationary side edge guides $G_1$ and $G_2$ (which have a longitudinally extending partial "twist" or cam surface) will close the side flaps 34, 36 over the already closed leading and trailing flaps 30, 32 as the filter moves through the guides. With all four flaps now held in place by the side edge guides $G_1$, $G_2$, the assembly passes immediately into a heating device including top and bottom hot plates H which maintain the flaps in their folded position, and which are heated to activate the pre-applied filter frame adhesive so as to complete the assembly process.

The completed filter assemblies may then be further processed and removed from the conveyor manually or automatically and packaged in the conventional manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the invention has been described in relation to a furnace filter assembly operation, it is equally applicable to other frame folding operations for any similarly shaped objects, packages, etc.

What is claimed is:

1. Apparatus for use in a filter assembly operation wherein filter components are seated within a filter frame such that the frame has a generally upstanding leading flap, side flaps and a trailing flap, the apparatus comprising:

side flap engaging augers, each having a spiral flight, and each rotatable about a longitudinal axis thereof, said augers adapted to push the pair of side flaps outwardly while said augers rotate to provide clearance necessary to close the leading and trailing flaps;

a stationary ski member located downstream of said side flap engaging members and adapted to close the leading flap; and a retractable ski member located at least partially upstream of said side flap engaging augers and adapted to close the trailing flap, thereby permitting said side flaps to be subsequently closed in an overlapping relationship with the leading and trailing flaps.

2. Apparatus according to claim 1 wherein each auger is located so as to engage and at least partially contribute to closing the trailing flap in cooperation with said retractable ski member.

3. Apparatus according to claim 1 wherein said augers are each movable through an arcuate path from an inoperative to an operative position.

4. Apparatus according to claim 3 and wherein means are provided to actuate said retractable ski member when said augers are in said operative position.

5. Apparatus according to claim 4 wherein said means cause said retractable ski to have a component of motion in a direction perpendicular to said augers.

6. Apparatus according to claim 4 wherein each auger is located as to engage and at least partially close the trailing flap in cooperation with said retractable ski member.

7. Apparatus according to claim 1 in combination with conveying means for continuously feeding a plurality of said filter assemblies towards said augers and said retractable ski.

8. Apparatus for assembling a filter including a frame surrounding and supporting a filter media pad, the frame having forward, side and trailing flaps adapted for folding downwardly into engagement with the filter media pad of the apparatus comprising:

a conveyor for feeding a plurality of filters in a first direction;

first means for opening the side flaps wherein said first means includes a pair of augers each having a longitudinal axis and a spiral flight, each said auger rotatable about its respective longitudinal axis;

second means for closing the forward flap;

third means for folding the trailing flap;

fourth means for folding the side flaps: and fifth means for holding the front, trailing and side flaps in a folded condition.

9. Apparatus according to claim 8 wherein said third means comprises an elongated member movable between inoperative and operative positions in timed relationship to said first means.

10. Apparatus according to claim 9 wherein each said longitudinal axis extends parallel to a direction of movement of the filter.

11. Apparatus according to claim 9 wherein said elongated member is arranged to engage said trailing flap at a location intermediate the side flaps, after said augers have engaged said side flaps.

12. Apparatus according to claim 11 wherein said elongated member includes means for imparting to said elongated member a component of motion in the direction of travel of said filter.

13. Apparatus according to claim 8 wherein said second means includes a pair of stationary ski members.

14. Apparatus according to claim 8 wherein said fourth means includes a pair of stationary edge guides.

15. Apparatus according to claim 8 wherein said fifth means comprises a plate extending parallel to said conveyor.

16. In an apparatus for assembling a filter media pad in a filter frame wherein the filter frame includes upstanding forward, rearward and side flaps, the improvement comprising a pair of augers arranged to engage the side flaps of the filter frame and to move the side flaps outwardly to permit folding of the forward and rearward flaps, said augers each having a longitudinal axis about which the respective auger rotates, and each having a spiral flight adapted to engage said side flaps.

17. A process for closing an open forward, trailing and side flaps of a frame about an insert seated within the frame, and wherein the frame includes at least partially open forward, trailing and side flaps, the method comprising the steps of:

a) feeding the frame and insert continuously in a first linear direction;

b) engaging the side flaps of the frame by a pair of rotating augers having spiral flights thereon to move the side flaps outwardly to a fully open position during continuous linear movement of the frame and insert:

c) folding the forward and trailing flaps to a closed position while the side flaps are engaged by the pair of rotating members:

d) folding the side flaps downwardly to a closed position, overlapping said forward and rearward flaps.

18. The process of claim 17 and further comprising, during step b), rotating said augers at a speed substantially equal to a feeding speed of said frame and insert in said first linear direction.

* * * * *